(No Model.) 5 Sheets—Sheet 1.
A. O. CARMAN.
MOWING MACHINE.
No. 389,544. Patented Sept. 18, 1888.
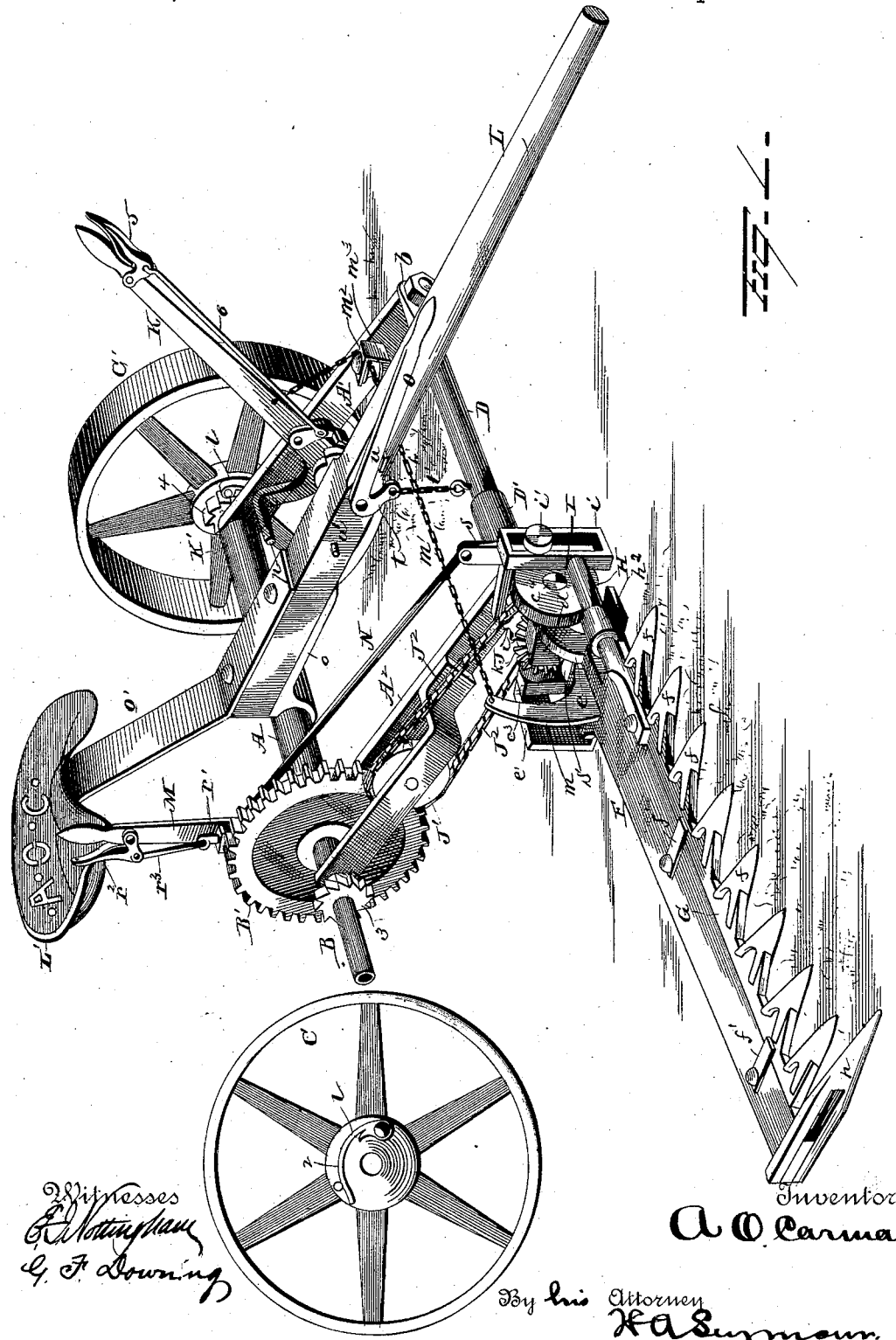

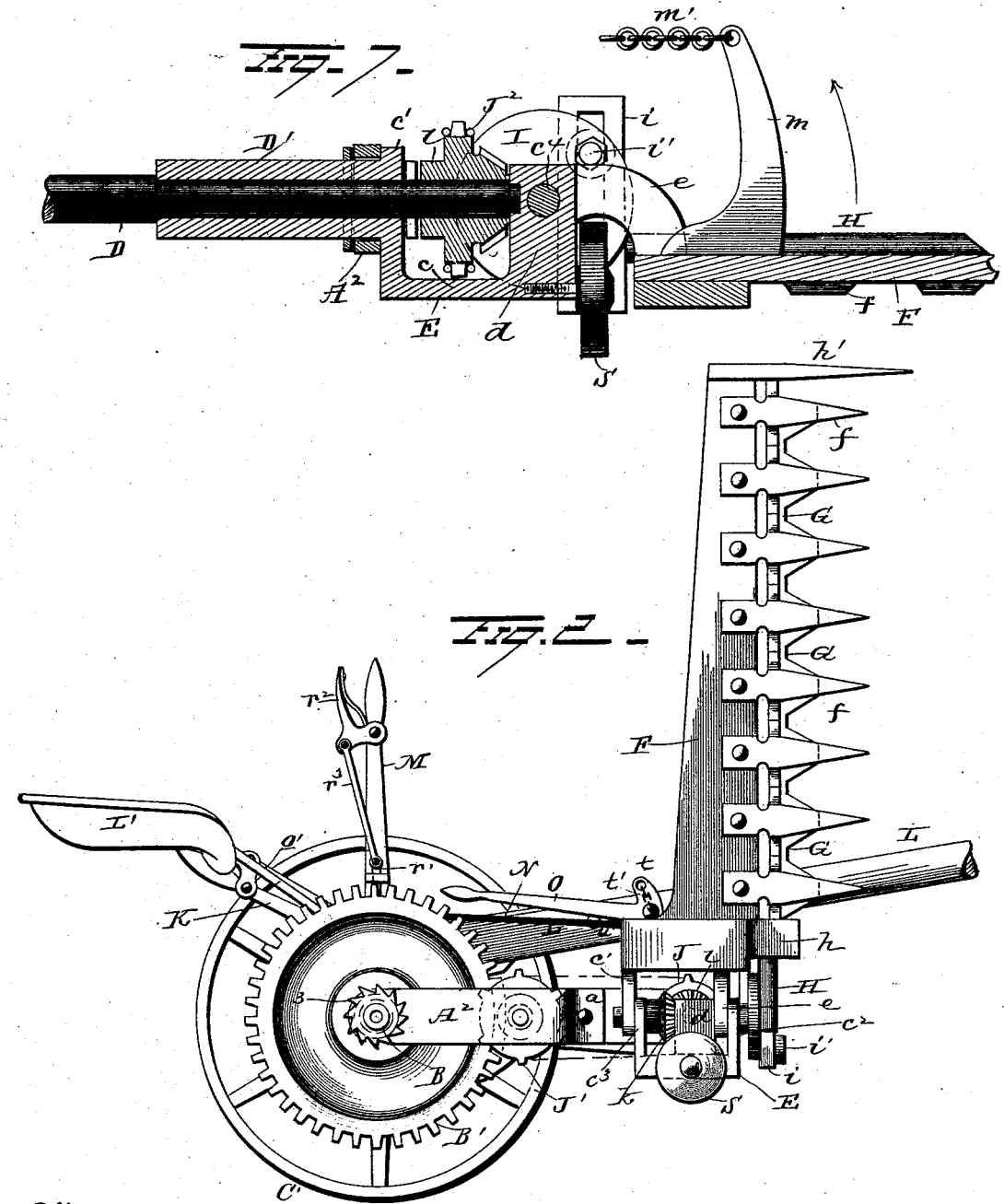

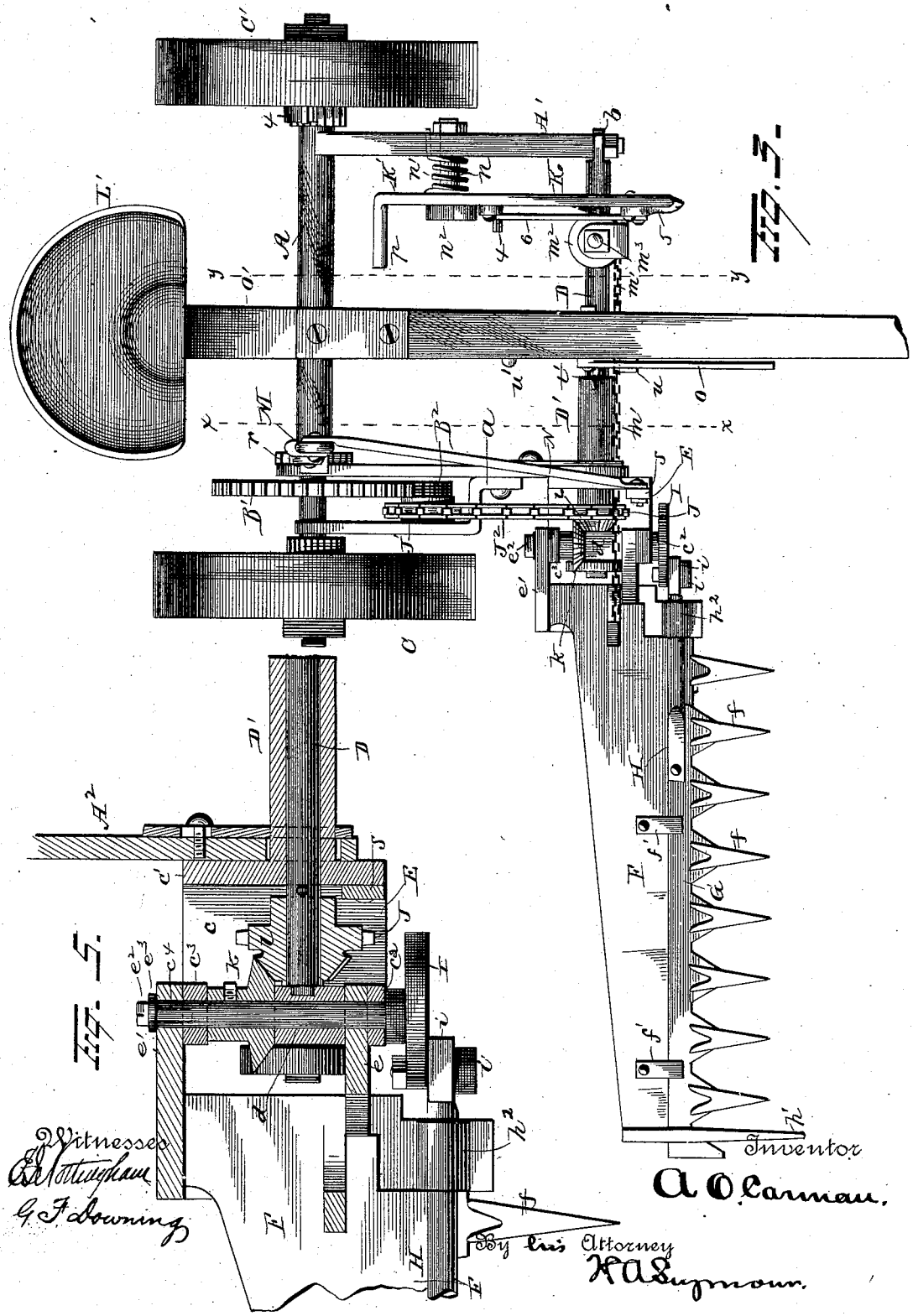

(No Model.)  5 Sheets—Sheet 4.
A. O. CARMAN.
MOWING MACHINE.
No. 389,544.  Patented Sept. 18, 1888.
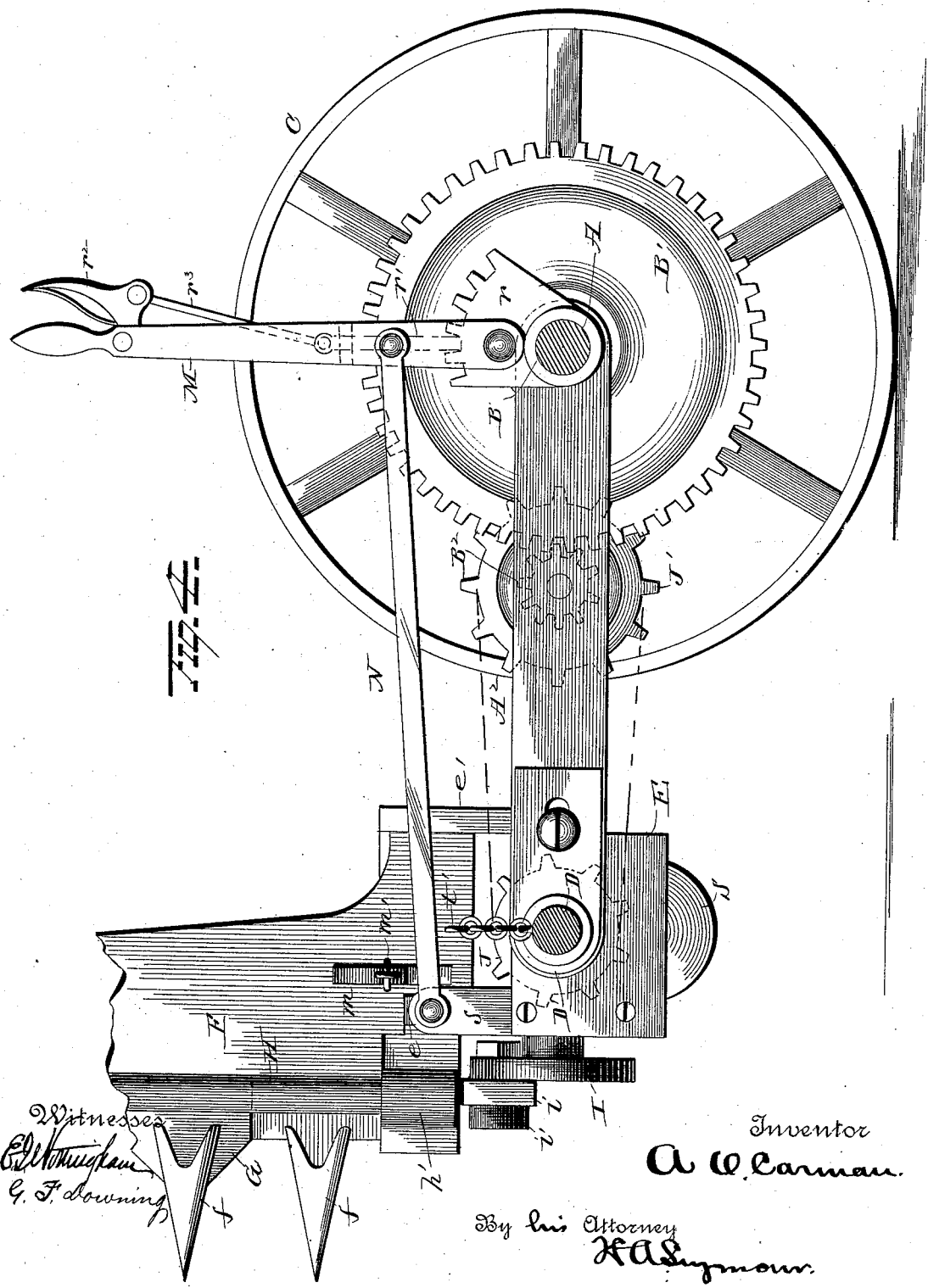
Witnesses  Inventor
A. O. Carman.
By his Attorney (No Model.) 5 Sheets—Sheet 5.
A. O. CARMAN.
MOWING MACHINE.
No. 389,544. Patented Sept. 18, 1888.
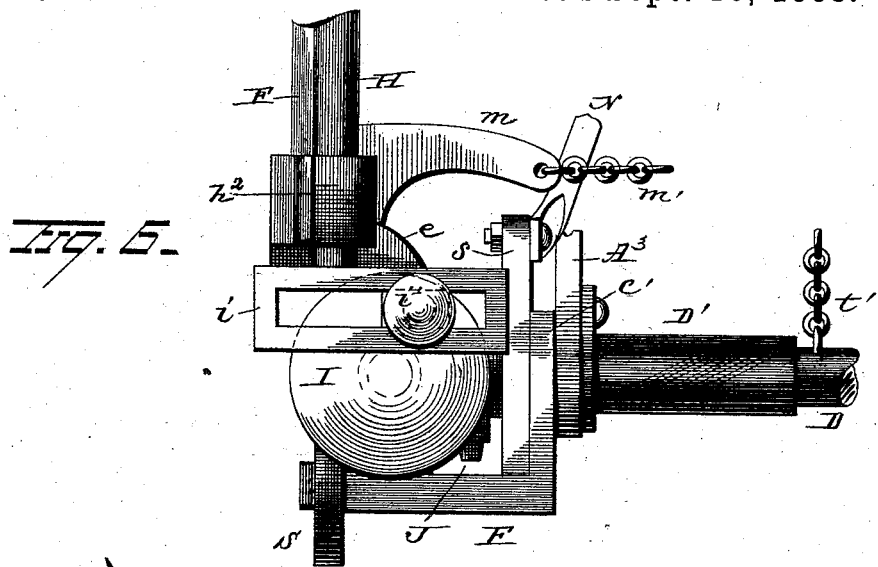
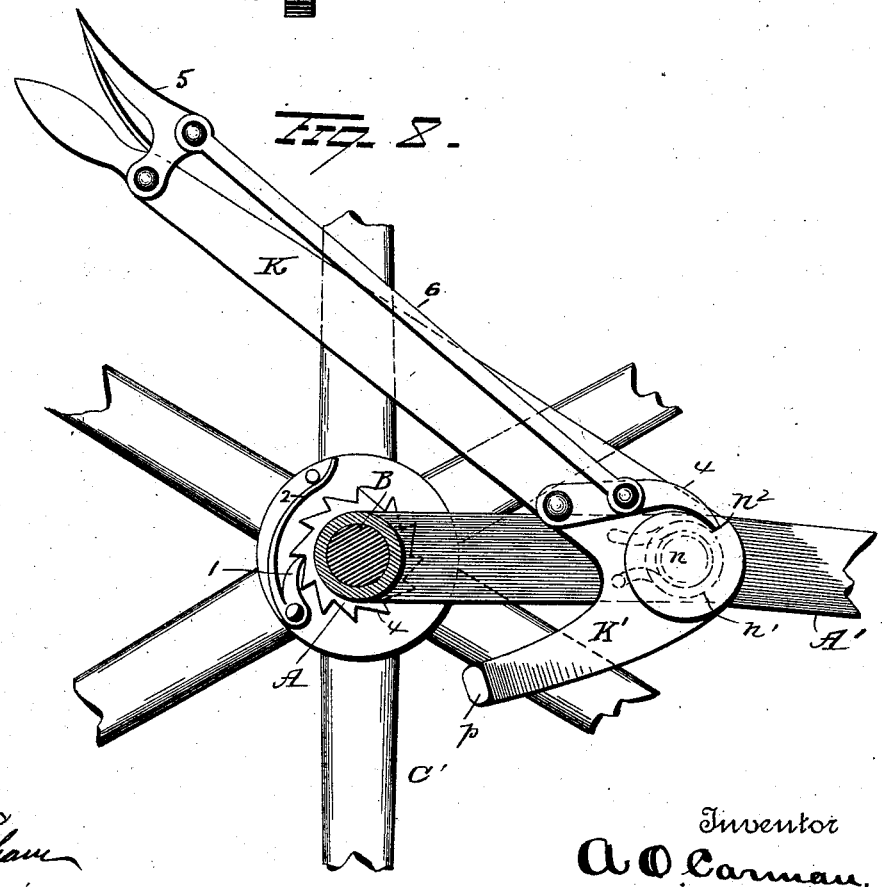
Witnesses
E. W. Nottingham
G. F. Downing
Inventor
A. O. Carman
By his Attorney
H. A. Simmons

UNITED STATES PATENT OFFICE.

ALVIN O. CARMAN, OF POTTERVILLE, MICHIGAN.

MOWING-MACHINE.

SPECIFICATION forming part of Letters Patent No. 389,544, dated September 18, 1888.

Application filed December 14, 1887. Serial No. 257,859. (No model.)

*To all whom it may concern:*

Be it known that I, ALVIN O. CARMAN, of Potterville, in the county of Eaton and State of Michigan, have invented certain new and useful Improvements in Mowing-Machines; and I do hereby declare the following to be a full, clear, and exact description of the invention, such as will enable others skilled in the art to which it appertains to make and use the same.

My invention relates to an improvement in mowing-machines, and more particularly to a class of machines having a finger-bar and its reciprocating knife-bar projected at one side of the frame of the machine.

In operating a mowing-machine of the type mentioned it is of great advantage to so joint the finger-bar to the frame of the machine that it may be vibrated to assume any desired angle with regard to the plane of the body of its axle and thus permit the bar to be elevated when in motion so as to clear any obstruction in front of it and also allow the machine to work without strain on a steep side hill.

In view of the desideratum above named the object of my present invention is to provide a simple compact mowing-machine that will have strength in all its working parts, lightness of draft, capability of elevation of its finger-bar to any point between a horizontal and perpendicular position while the machine is in motion, equality of cutting-power at any angle given the cutter-bar, and full reciprocatory travel of the sickle-bar, so as to register with its guards when in motion at any angle assumed by the finger-bar.

With this object in view my invention consists in certain features of construction and combinations of parts, that will be hereinafter described, and pointed out in the claims.

Referring to the drawings, Figure 1 is a view in perspective of the machine with the finger-bar lowered into position for use. Fig. 2 is a view of the machine from the right side of the same, showing the finger-bar in a vertical position. Fig. 3 is a plan view of the machine. Fig. 4 is a section on line $x\,x$ of Fig. 3. Figs. 5, 6, and 7 are detached views of the parts that regulate the inclination of the guard-fingers and finger-bars; and Fig. 8 is a sectional view on line $y\,y$ of Fig. 3.

The frame of the mower is preferably made of metal, as are all the working parts of its mechanism; and it consists of a hollow sleeve-piece, A, which is axially perforated and serves as a box for the axle B to turn in. This sleeve A is proportioned in length to the width between the ground-wheels C C' of the machine, and at the left side, considered from the rear of the machine, an arm, A', is forwardly extended a proper length.

The axle B, journaled in the sleeve-piece A, is extended at each end of this sleeve to form spindles for the wheels C C', (see Figs. 1 and 3,) and at the right side of the machine, considered from the rear, a sufficient length of the axle is provided between the inner face of the hub of the ground-wheel C and the sleeve to receive the perforated ends of the forked frame-piece A². This piece, branching at $a$, projects forwardly as a single limb, A³, the entire frame-piece being about equal in length to that of the integral frame piece or arm A' on the opposite side of the machine.

Each of the wheels C C' is provided with a pivoted pawl, 1, located, with its attached spring 2, upon the inner face of its hub, so as to engage the teeth of the ratchet-wheel 3 or 4, which is secured to that end of the axle B, and thus lock the wheels to the axle when the mower is forwardly moved, the teeth of the ratchet-wheels permitting the ground-wheels C C' to freely revolve on the spindles of the axle B when the machine is pushed backward.

Upon the front end of the frame piece or arm A' a coupling-arm, D, is pivoted to vibrate vertically, an ear, $b$, being formed on the end of the arm D, that is perforated to receive the rounded front end of the arm A', on which this ear is loosely secured. On the arm D a sleeve, D', is loosely mounted, this sleeve passing through a hole made to receive it near the front end of the forked frame-piece A², the hole being made of sufficient size to allow a free rocking movement vertically of this end of the arm D, in a manner and for a purpose that will be indicated in the further description of this and connected parts of the machine.

The casting E, of which the sleeve D' is a lateral extension, (see Fig. 7,) has a horizontal base-plate, $c$, on which the vertical flange $c'$ is formed. From the flange $c'$ the sleeve D' extends at right angles. On the outer edge of the base-plate $c$, at the corners of the same, posts $c^2$ $c^3$ are erected. These are perforated to receive a cross-shaft, $c^4$. (See Fig. 5.) A center post, $d$, also on the casting E, is located between the two outside posts and is perforated in line with them, the shaft $c^4$ passing through this perforation. Between the center post, $d$, and the front post, $c^2$, of the casting E the lug $e$ on the heel end of the finger-bar F is inserted. This lug is perforated near the outer end, that is located between the posts $d$ and $c^2$, as just stated, to receive the shaft $c^4$, and another lug, $e'$, on the finger-bar F, at its rear heel corner, is also perforated to receive the end of the shaft $c^4$ and be secured in place by a washer and screw-bolt, $e^2$, that enter the end of the shaft, the washer $e^3$ bearing on the outer face of the lug $e'$ to hold the parts together.

The finger-bar F is made of proper length, and has the usual guard-fingers, $f$, secured to its forward edge, the sickle-bar G being loosely mounted to slide in the open slots of the guard-fingers and through the outer finger, $h$. The flat body of the sickle-bar is located in the usual shallow recess produced by the attachment of the guard-fingers $f$ to the lower side of the cutter-bar. The rear edge of the cutter-bar having a sliding engagement with the forward edge of the finger-bar, is secured by the clip-plates $f'$ to hold the bar from rising off of its seat in the guard-fingers.

At the inner end of the sickle-bar G a pitman, H, is fastened. This pitman is preferably rounded, so as to slide through the guide-box $h^2$, which is attached to the upper surface of the finger-bar F. On the inner end of the pitman H an integral slotted end piece, $i$, is formed, which is vertically located, and is flattened to permit its adjacent face to lie close to the crank-disk I, which is affixed to the cross-shaft $c^4$. A crank-pin, $i'$, is secured to this disk, so as to give proper reciprocating motion to the sickle-bar G as it rotates and slides up and down through the elongated slotted end $i$ of the pitman H. It will be noticed that the slotted end piece, $i$, of the pitman H has its point of connection with the rounded body of the pitman made near its lower end, so that a free revolution of the crank-disk I may be effected and not extend the lower end of the end piece, $i$, below the base-plate $c$ of the casting E.

In order to give rotary motion to the cross-shaft $c^4$ and attached crank-disk I, a bevel-pinion, $k$, is secured on this shaft, it being placed between the center post, $d$, and rear post, $c^3$. The pinion $k$ receives motion from a meshing pinion, $l$, which is made integral with the adjacent face of a sprocket-wheel, J, loosely mounted on the outer end of the coupling-arm D, and upon the axle B a spur gear-wheel, B′, is affixed, which meshes with a small pinion, B², that is integral with a sprocket-wheel, J′, this wheel and the pinion being placed between the arms of the forked frame-piece A².

A chain, J², placed on the wheels J J′, transmits motion and power from the axle B to the crank-disk I, and through the pitman H to the sickle-bar G, affording to the latter a rapid reciprocating motion.

It will be seen on inspection of Fig. 7 that the center of the pivotal point of support of the finger-bar F on the cross-shaft $c^4$ is coincident with the center of the arm D, which carries the actuating-gear which transmits motion to this shaft, so that the upward vibration or rocking movement of the finger-bar F on its pivot-shaft $c^4$ will have no evil effect on the reciprocal motion of its sickle-bar, which will be driven with equal ease at any point of elevation of the finger-bar from a horizontal to a perpendicular position.

To facilitate the elevation and secure adjustment of the finger-bar F, an arm, $m$, is attached to the top surface of the finger-bar near its inner end, and to the top of this arm a chain, $m'$, is hooked fast. The chain, being extended across the front of the mower-frame, is passed around the grooved pulley $m^2$, which is supported upon the top of the post $m^3$, secured to the coupling-arm D, the end of the chain being attached to the upright lever K. A stud, $n$, is attached to the inner surface of the frame-piece A′, upon which the lever K is pivotally supported. The spiral spring $n'$, encircling the stud $n$, has one of its ends inserted into a hole in the lever K and the other end bent to form a hook, which is made to engage the lower edge of the frame-piece A′, so that the strength of the spring may be utilized to counteract the weight of the finger-bar and sickle-bar, the spring acting only when the finger-bar is raised to thus reduce the labor of elevating these pieces.

Upon the sleeve-piece A of the mower-frame an integral pad, $o$, is formed, to which is secured the rear end of the tongue or pole L of the mower, and a seat, L′, is mounted on a bent bracket-arm, $o'$, the position of the pad $o$ locating the tongue and seat about midway between the wheels C C′.

The lever K is provided with a short rearwardly-extended limb K′, which has a foot-piece, $p$, extended from its rear end toward the side of the tongue L, so as to be convenient for use of the driver, who occupies the seat L′, as by its means the left foot may be employed to supplement the grasp of the hand on the lever K when the finger-bar is to be changed quickly from a lower to a higher position of its outer end—or, in other words, to throw this bar on an incline to suit ground-surface or clear obstructions in its path.

The lever K is furnished with a locking-dog, 4, and thumb-latch 5, connected to this dog by a link, 6, the toe of the pivoted dog 4 being made to engage a notch in the head $n^2$ of the stud $n$ to hold the lever in place on the stud. By use of the locking device just described the cutter-bar may be temporarily secured in an elevated position when the machine is in transit to or from the field where it is to be used, or at any time when it is desirable to hold the finger-bar in a vertical position.

Upon the right side of the seat L' a vertical lever, M, is secured by a pivotal connection of its lower end to the side of the upright segmental plate r, which is preferably made integral with the sleeve-piece A of the mower-frame, this plate having notches cut at spaced intervals in its curved top edge, that are adapted to have locking engagement with a slide-bolt, r', which latter is actuated by a spring-latch, r², and a link, r³, in the manner usual to such devices, the length of the lever M being such that its upper end will be convenient for grasping by the right hand of the driver.

Upon the side of the vertical flange c' of the casting E an upright arm, s, is secured, and to the top of this arm a connecting-rod, N, is pivoted at one of its ends, the other end of this rod being pivoted to the side of the vertical lever M. The arm s is located in front of the sleeve D' of the casting E, and as the coupling-arm D, on which this sleeve is mounted, is the pivot-center of the finger-bar, considered transversely of its body, it follows that a rearward movement of the lever M will rock the finger-bar F on its center bearing, so as to lift the points of the guard-fingers and front edge of the sickle-bar higher than the rear edge of the finger-bar, and a reverse movement of the lever to throw it forward will depress the front edge of the finger-bar and its attachments, so that any desired pitch of the finger-bar from front to rear edge of the same or the reverse may be readily obtained, and this adjustment of the bar be secured by the lever M and its locking mechanism.

On the side of the pole or tongue L is a lever, O. This lever is provided with a bent lower end, t, to which the chain t' is attached, the lower end of this chain having a hooked engagement in an eye inserted in the body of the coupling-arm D. When the arm D and finger-bar F are intended to lie in horizontal and parallel planes, the lever O will be forwardly projected and rest with its edge against the stop-plate u. If, however, it is desired to elevate the finger-bar F and still have the same horizontal plane, so as to cut the grass higher up above the ground, the lever O is reversed in position, so that its rear edge rests against the stop-block u'. The bent short arm t will thus be thrown up and the arm D be caused to rise correspondingly. The lever K may now be adjusted to level the finger-bar and cause it to assume a horizontal plane or any degree of inclination from the horizon, considered longitudinally of the sickle-bar, that may be desired, to suit the ground-surface over which the mower may be moving, and to facilitate this movement a small wheel, S, is pivoted to the front edge of the casting E to revolve freely on its stud.

It will be apparent from the foregoing description of the mechanical details of this mowing-machine that the finger-bar is afforded a universal adjustment as to position, as it may be elevated and depressed in parallel planes either horizontal or inclined to the horizon, or the cutter-bar may be elevated at any desired angle from a horizontal position to a vertical plane without cessation of reciprocal motion of the sickle-bar or any increase of frictional resistance of the working parts of the machine; and, further, the finger-bar may be rocked upon its sleeved connection with the coupling-arm d, so as to afford a means of adjusting the guard-fingers and sickle-knife points to pitch upwardly at any desired angle, while the rear edge of the finger-bar is correspondingly depressed, or the front ends of the guard-fingers f may be depressed below a horizontal position if such an adjustment of the finger-bar is desired.

It should be mentioned that the manner in which the axle B turns in the hollow sleeve A of the mower-frame, and the ratchet-and-pawl attachment of the ground-wheels C C' to the axle, so as to allow a free revolution of these wheels on the axle-spindles when the machine is moved backward, and a rigid lock of these wheels to the axle to cause a rotation of the latter when the machine is moved forward, render each of the ground-wheels a driver for the shaft, so that the reciprocatory movement of the sickle-bar is rendered more positive owing to the extended surface of contact of the wheels with the ground, the entire weight of the frame, mechanism, and occupant of the seat being thrown on both of the wheels to prevent their slipping.

All of the working parts of this mower are in plain sight and freely accessible to lubricate. There are but few bolts or nuts to get loose and render the machine unreliable; the operating mechanism is simple, easy to repair, will not become deranged or quickly worn out; and it is confidently claimed for this machine that it is possessed of all the elements necessary to render it reliable in operation where others not possessing its novel features of excellence will fail to render satisfaction.

It is obvious that many slight changes in the form of the working parts and their arrangement together might be made and still lie within the scope and spirit of my invention; hence I do not desire to restrict myself to the exact forms and combinations of parts herein shown; but, Having fully described my invention, what I claim as new, and desire to secure by Letters Patent, is—

1. In a mowing-machine, the combination, with an axle-sleeve, an axle journaled therein, said axle having a main gear-wheel mounted thereon, forwardly-projecting arms, one rigidly secured to the axle-sleeve and the other loosely mounted on the axle in close proximity to the main gear-wheel and having a combined gear-and-sprocket wheel journaled therein, the teeth of said gear-wheel being meshed with the main gear-wheel on the axle, of a coupling-arm pivoted at one end to the rigid arm, a casting sleeved on the grain end of the coupling-arm, and a combined gear-and-sprocket wheel loosely mounted on the coupling-arm, a chain for communicating motion from one sprocket-wheel to the other, a shaft journaled in the casting and having a crank-disk and a gear-wheel thereon, the latter meshed with the gear-wheel on the coupling-arm, a finger-bar pivoted on this shaft, and a reciprocating cutter-bar receiving motion from the crank-disk.

2. In a mowing-machine, the combination, with an axle-sleeve, an axle journaled therein, forwardly-projecting arms, one secured to the axle-sleeve and the other pivoted on the axle, of a coupling-arm pivoted to the rigid forwardly-projecting arm, a casting sleeved thereon at the grain end, a cross-shaft journaled in the casting, gearing for communicating motion to said shaft, a finger-bar pivoted on said shaft, and a reciprocating cutter-bar, substantially as set forth.

3. In a mowing-machine, the combination, with an axle-sleeve, an axle journaled in the sleeve, and forwardly-projecting arms, one secured to the sleeve and the other pivoted to the axle, of a coupling-arm pivoted to the rigid forwardly-projecting arm, a casting sleeved thereon at the grain end, a cross-shaft journaled in the casting, gearing for communicating motion thereto, a finger-bar pivoted on said shaft, a reciprocating cutter-bar, and a lever mounted on the frame and having a loose connection with the finger-bar for raising or lowering it on its pivotal shaft, substantially as set forth.

4. In a mowing-machine, the combination, with an axle sleeve, an axle journaled in the sleeve, and forwardly-projecting arms, one secured to the axle-sleeve and the other pivoted on the axle, of a coupling-arm pivoted to the rigid forwardly-projecting arms, a casting sleeved on the grain end of said coupling-arm, a cross shaft journaled in the casting, gearing for communicating motion to this cross-shaft, a finger-bar pivoted on the cross-shaft, a combined foot-and-hand lever for raising and lowering said bar on its pivotal shaft, and a hand-lever for rocking the finger-bar on the coupling-arm and a hand-lever for raising and lowering the coupling-arm, substantially as set forth.

5. In a mowing-machine, the combination, with an axle-sleeve, an axle adapted to turn in the sleeve, and a spur gear-wheel fixed on the axle, of a pair of forwardly-projecting arms, one arm secured to the axle-sleeve and the other loosely mounted upon the axle, a coupling-arm pivoted to the rigid arm, a casting having a projecting sleeve pivotally connected with the loosely-mounted arm and loosely mounted on the pivoted coupling-arm, a gear-wheel on the end of the latter, a gear-wheel journaled in the loosely-mounted arm, said wheel receiving motion from the spur gear-wheel on the axle, a chain for communicating motion from one wheel to the other, a cutter-bar and gearing to drive it from the gear-wheel on the arm, substantially as set forth.

6. In a mowing machine, the combination, with a frame, a revolving axle, a spur gear-wheel secured to the axle, and arms projecting forwardly from the axle, one of said arms being forked and straddling the spur gear-wheel and having a sprocket gear-wheel journaled therein, the latter engaging with the spur gear-wheel, of a coupling-arm pivoted to the other one of the forwardly-projecting arms, a casting sleeved on the coupling-arm and pivotally connected with the forked arm, a gear-wheel loosely mounted on the end of said coupling-arm, a shaft journaled in the casting at right angles to the coupling arm and having a gear-wheel secured thereto adapted to receive motion from the wheel on the coupling-arm, a finger-bar pivoted on the shaft in the casting, a cutter-bar therein adapted to receive motion from the shaft, and an endless chain for communicating motion from the gear-wheel in the forked forwardly-projecting arm to the wheel on the coupling-arm, substantially as set forth.

In testimony whereof I have signed this specification in the presence of two subscribing witnesses.

ALVIN O. CARMAN.

Witnesses:
CHAS. NIXON,
N. J. PERRY.